United States Patent [19]
Leach et al.

[11] 3,855,320
[45] Dec. 17, 1974

[54] PURIFICATION OF ZIEGLER ALCOHOLS
[75] Inventors: Bruce E. Leach; Kaye L. Motz, both of Ponca City, Okla.
[73] Assignee: Continental Oil Company, Ponca City, Okla.
[22] Filed: Aug. 2, 1973
[21] Appl. No.: 385,217

[52] U.S. Cl. .......... 260/643 F, 260/488 J, 260/499, 260/614 R, 260/642 R, 260/643 B
[51] Int. Cl. ..................... C07c 29/24, C07c 33/02
[58] Field of Search ..... 260/643 F, 682, 642, 643 B

[56] References Cited
UNITED STATES PATENTS

| | | | |
|---|---|---|---|
| 3,244,766 | 4/1966 | Keough | 260/682 |
| 3,033,778 | 5/1962 | Frilette | 260/682 |
| 3,461,176 | 8/1969 | Lundeen et al. | 260/643 F |
| 3,283,015 | 11/1966 | Starks | 260/643 F |
| 2,585,816 | 2/1952 | Mertzweiller | 260/643 F |
| 3,232,848 | 2/1966 | Johnson | 260/643 F |
| 2,454,936 | 11/1948 | Morey | 260/642 |
| 2,086,713 | 7/1937 | Grun | 260/642 |
| 3,270,065 | 8/1966 | Austin | 260/643 B |
| 3,450,735 | 6/1969 | Lundeen et al. | 260/643 B |
| 3,505,414 | 4/1970 | Rogurin et al. | 260/643 B |

FOREIGN PATENTS OR APPLICATIONS

| | | | |
|---|---|---|---|
| 1,149,281 | 4/1969 | Great Britain | 260/643 F |

*Primary Examiner*—Joseph E. Evans

[57] ABSTRACT

The higher linear primary alcohols prepared in accordance with Ziegler chemistry contain contaminant amounts of similarly boiling diols. Upon contacting a dehydration catalyst with the impure alcohol product, the diols present therein are selectively converted into substantially lower boiling derivatives readily separated from the desirable alcohols by conventional thermal fractionation practices.

5 Claims, No Drawings

PURIFICATION OF ZIEGLER ALCOHOLS

This invention relates to a method for treating primary alcohols containing a contaminant amount of similarly boiling diols to effect selective dehydration of the latter.

The Ziegler synthesis procedure for the manufacture of primary aliphatic alcohols gives rise to products contaminated with a very small amount of diols, usually in the order of about 1 percent. The resultant diol species have boiling characteristics corresponding almost identically to those of the mono-alcohols present in the product having four additional carbon atoms in their structure. Accordingly, it is virtually impossible to obtain a product free of the diols by conventional thermal distillation practices. Inasmuch as the aforesaid synthesis method results in the formation of diols of varying carbon atom content, fractionating the alcohol product to obtain narrower boiling fractions does not satisfactorily serve to reduce the diol content. As a matter of fact, some of the narrower boiling fractions offered commercially for various end-use applications often may contain a diol content higher than that associated with the overall crude product.

While the crude product or fractions thereof contain diols in what appears offhand to be a commercially tolerable limit, this is more apparent than real. The objection to the presence of stated contaminants shows up in various uses of the alcohol products. For example, such products are used extensively to prepare surface-active agents in the form of sulfated derivatives thereof, and in the course of deriving such surfactants, the diol content is converted to an extremely odoriferous material. Therefore, it is practically necessary to reduce the diol content to not in excess of about 0.05 percent in order to prepare acceptable surfactant derivatives of the indicated variety. Additionally, the contemplated alcohols are used prevalently in the manufacture of viscosity index improvers for lubricating oils. The presence of difunctional materials in the order of that even associated with the raw product substantially exceeds the tolerable limit of such components in preparing suitable improvers.

A number of ways has been proposed for treating the contaminated primary alcohols for the purpose of selectively converting the diols into derivatives capable of being separated from the desirable alcohols. Most of these proposals, details of which need not be elaborated upon, are reasonably effective for achieving this objective. However, these methods in the main do not result in the selectivity required for an economical operation in that about 5 percent loss of the desirable alcohols generally obtains in the practice thereof due to the formation of high levels of ether.

The prior art most closely related to the present invention is represented by the subject matter disclosed and claimed in the British Pat. No. 1,149,281. This patent is directed, amongst other embodiments, to treatment of primary alcohols obtained in accordance with Ziegler chemistry in the liquid phase with an oxidic compound of the elements aluminum, zirconium or titanium as catalysts. The practice of this prior art method results in the removal of diol contaminants accompanied by a low amount of change in the desirable alcohol.

The dehydration process of this invention is equivalent to that of the aforementioned patent application as regards the negligible change in desirable alcohols encountered in the treating process. Moreover, the present invention provides improved selectivity to the conversion of the diol contaminants. The present invention provides further an improved process in that exceptionally low levels of ether formation are encountered in the dehydration of the diols. By the practice of the present invention, a process is provided which is decidedly simpler to carry out.

In accordance with this invention, a primary alcohol product containing a contaminant amount of a diol is contacted in the liquid phase and at a temperature between about 170°C and 275°C with a calcium oxide on alumina catalyst to effect selective conversion of the diol to a substantially lower boiling derivative thereof. The invention in fulfillment of its foremost objective, namely the purification of said alcohol products, contemplates the recovery of the desirable mono-alcohols in an essentially pure form by conventional thermal fractionation practices. A further embodiment of the invention resides in subjecting the calcium oxide on alumina treated alcohol product to mild hydrogenation either before or after the aforementioned recovery step for the purpose of reducing to a minimum traces of unsaturates and/or carbonyl compounds present therein.

As indicated throughout the above discussion, the contemplated alcohols for use in implementing this invention are those derived via Ziegler chemistry. In accordance with this synthesis method, a lower aluminum alkyl; e.g., aluminum triethyl, is reacted with ethylene whereby the latter progressively adds to the aluminum triethyl to provide a complex mixture of higher aluminum alkyls commonly referred to as a growth product. The alkyl residue or moiety of the growth product follows a statistical distribution pattern peaked with such groups having $2m + 2$ carbon atoms where $m$ represents the mean number ethylene additions accomplished in the course of the growth reaction.

In the production of alcohols, the growth product is next oxidized by contact with air. The oxidation step provides an aluminum alkoxide mixture which upon hydrolysis yields a corresponding mixture of primary alcohols. The oxidation step, however, also results in the formation of a higher oxygenated material which is then subsequently converted to polyols, for the most part diols, in the hydrolysis procedure. The diols formed in the hydrolysis step consist principally of 1,2- and 1,3-dihydroxy compounds having a carbon atom length distribution corresponding to about that of the starting growth product. As mentioned previously, these diols are generally present in the order of about 1 percent of the product.

The dehydration catalyst applicable in the practice of this invention is an acidic alumina modified with calcium oxide. Although any acidic alumina catalyst when modified with calcium oxide is suitable for the present invention, the most significant results, when comparing modified with unmodified aluminas, are achievable with the highly acidic aluminas.

It has been found that an ideal alumina catalyst for use in the practice of the present invention is one containing acid sites of sufficient strength to remove diols at low temperatures (~200°C) but not form ether until high temperatures (~300°C) are reached.

It is believed that ether formation is catalyzed by strong acid sites of the catalyst and that diol removal occurs on weak acid sites of the catalyst. Therefore, the addition of calcium oxide on an alunina of high acidity neutralizes the strong acid sites thereof and consequently reduces ether formation when same is employed in the practice of the present invention.

The dehydration catalyst employed in the practice of the present invention is best achieved by adding a soluble salt such as calcium acetate to alumina which upon calcining decomposes to the oxide.

The broad range of temperatures applicable for effecting selective dehydration of the diols is from about 170° to 275°C. The more preferred range is from about 215° to 250°C. In the practice of the preferred embodiment of the invention involving the use of a modified catalyst system; i.e., calcium oxide on highly acidic alumina; in combination with a temperature within the indicated preferred range, a complete conversion of the diols can be realized accompanied by negligible degradation of the desirable alcohols by ether formation.

The reaction residence time; i.e., the time the diol-containing alcohol is in contact with the catalyst, is dependent upon the extent of conversion desired and the operating temperature. As one would expect, for a given degree of dehydration or conversion sought, the higher the operating temperature the less residence time will be required. Reaction conditions can be selected which will result in complete selective conversion of the diol content to substantially lower-boiling derivatives in a one-step operation obviating the need for further cycling the contacted material. The process of this invention can be carried out under atmospheric, sub- or super-atmospheric pressure. Quite obviously, the selection of pressure conditions will depend upon the operating temperature contemplated in light of the particular volatility characteristics of the treated alcohol or mixture thereof.

Most of the dehydrated derivatives can be removed by simple distillation or topping procedure. Before topping, it is preferred however, to observe the conventional procedure of hydrogenating the alcohol mixture to reduce the unsaturate and carbonyl content of the treated alcohol. Alternatively, the light ends can be removed from the treated alcohol followed by mild hydrogenation. Hydrogenation can be conveniently accomplished in the presence of any conventional catalyst; e.g., nickel.

The following tables compare the preferred manner for carrying out the present invention employing the preferred catalysts with other catalysts in regard to diol removal and ether formation. Accordingly, any enumeration of details contained therein is not necessarily to be interpreted as a limitation on the invention. The only limitations intended are those set forth in the appended claims.

Various alumina samples were compared with respect to diol removal and ether formation in a system of 1,3-octanediol in 1-octanol. The 1,3-diol was chosen since about 85 percent of the diols present in Ziegler type alcohols are the 1,3 isomers.

The catalyst samples were evaluated by passing ALFOL 8 alcohol containing about 0.5 percent 1,3-octanediol over the catalyst and determining the amount of diol and dioctyl ether in the effluent. The pelletized catalyst was contained in a ⅝-inch by 6-inch stainless steel tube with taped caps at each end. The reactor was heated with a heating tape and temperatures were measured by thermocouples placed in a thermowell which ran the length of the reactor in the center. Alcohol was pumped into the bottom of the vertically mounted reactor with a small positive displacement pump. After passing through the reactor, the alcohol entered a ¼-inch line which was immersed in a water bath and then passed through a backpressure regulator into a receiver. The system operated smoothly at a pressure of 100 psi. A pump rate of 60 ml/minute was utilized.

Since diol is difficult to analyze directly by gas chromatography, analyses were performed on the acetates. Ketene was passed through a mixture of 50 $\mu$ of sample, 50 $\mu$ of toluene and 1 drop of concentrated sulfuric acid for 2 minutes. The samples were aged for 10 minutes in an oil bath at 80°C. Ammonia was then passed through the samples for 15–30 seconds to neutralize the acid. The acetate mixture was analyzed on a silicon SE-30 gas chromatography column.

The catalysts compared in the following tables were prepared as follows:

1. Alcoa F-1 Alumina — This alumina contains about 0.8 percent $Na_2O$ which produces a material of low acidity. A sample of this alumina was washed three times with acetic acid to remove $Na_2O$, dried and calcined for 30 minutes at 570°C.

2. Conoco Alumina with 5% CaO — 16 grams of Conoco Alumina which had been pelleted and calcined was impregnated with 21 cc $H_2O$ containing 2.70 gm calcium acetate $[Ca(C_2H_3O_2O_2)_2 \cdot H_2O]$ and calcined contained 5 percent CaO.

3. CaO alone

4. Conoco Alumina — This alumina is a low density, high porosity alumina of high surface acidity It was prepared from alumina filter cake obtained by basic hydrolysis of aluminum alkoxides by washing twice with 3.2 pounds ethanol per pound of alumina filter cake. The alumina was formed into pellets approximately 2 × 4 mm (1 × $d$) having a density of 22–25 lbs/ft³, cumulative pore volume 1.32 cc/g, and a surface area of nearly 300 m²/g.

COMPARISON OF DIOL REMOVAL AND ETHER FORMATION
BY ALUMINA IN 1-OCTANOL CONTAINING 1,3-OCTANEDIOL

| Wt g | ALUMINA Source | TIME Hr At Cond | Hr Total | Temp °C | Feed % Diol | PRODUCT % Diol | % Ether |
|---|---|---|---|---|---|---|---|
| 24.6 | F-1 Alcoa | 1.0 | 1.0 | 200 | .51 | .14 | .04 |
| 24.6 | F-1 Alcoa | 1.0 | 2.0 | 240 | .51 | .10 | .05 |
| 24.6 | F-1 Alcoa | 1.0 | 3.0 | 150 | .51 | .38 | .03 |
| 24.6 | F-1 Alcoa | 1.0 | 4.0 | 175 | .51 | .47 | .02 |
| 10.9 | Conoco Alumina | 1.0 | 1.0 | 150 | .51 | .14 | .02 |
| 10.9 | Conoco Alumina | 1.0 | 2.0 | 200 | .51 | .20 | .14 |
| 10.9 | Conoco Alumina | 1.0 | 3.0 | 150 | .51 | .29 | .08 |
| 10.9 | Conoco Alumina | 1.0 | 4.0 | 200 | .51 | .28 | .18 |

—Continued

COMPARISON OF DIOL REMOVAL AND ETHER FORMATION
BY ALUMINA IN 1-OCTANOL CONTAINING 1,3-OCTANEDIOL

| Wt g | ALUMINA Source | TIME Hr At Cond | TIME Hr Total | Temp °C | Feed % Diol | PRODUCT % Diol | PRODUCT % Ether |
|---|---|---|---|---|---|---|---|
| 10.9 | Conoco Alumina | 1.0 | 5.0 | 240 | .51 | .18 | 3.19 |
| 10.9 | Conoco Alumina | 1.5 | 6.5 | 240 | .51 | .13 | 3.00 |
| 10.9 | Conoco Alumina | 1.0 | 7.5 | 220 | .51 | .09 | 1.20 |
| 10.9 | Conoco Alumina | 1.0 | 8.5 | 200 | .51 | .13 | .45 |
| 10.9 | Conoco Alumina | 1.7 | 10.2 | 200 | .51 | .19 | .36 |
| 3.0 | CaO | 1 | 1 | 200 | .39 | .35 | .02 |
| 3.0 | CaO | 1 | 2 | 200 | .39 | .47 | .02 |
| 3.0 | CaO | 1 | 3 | 240 | .39 | .32 | .03 |
| 3.0 | CaO | 1 | 4 | 240 | .39 | .48 | .03 |
| 11.7 | Conoco Alumina-5% CaO | 1 | 1 | 200 | .45 | .10 | .01 |
| 11.7 | Conoco Alumina-5% CaO | 1 | 2 | 200 | .45 | .26 | .01 |
| 11.7 | Conoco Alumina-5% CaO | 1 | 3 | 200 | .45 | .12 | .02 |
| 11.7 | Conoco Alumina-5% CaO | 1 | 4 | 240 | .45 | .14 | .02 |
| 11.7 | Conoco Alumina-5% CaO | 1 | 5 | 240 | .45 | .17 | .04 |
| 11.7 | Conoco Alumina-5% CaO | 1 | 6 | 240 | .45 | .12 | .03 |
| 11.7 | Conoco Alumina-5% CaO | 1 | 7 | 240 | .45 | .08 | .03 |
| 11.7 | Conoco Alumina-5% CaO | 1 | 8 | 240 | .45 | .04 | .02 |
| 11.7 | Conoco Alumina-5% CaO | 1 | 9 | 240 | .45 | .04 | .07 |
| 11.7 | Conoco Alumina-5% CaO | 1 | 10 | 200 | .45 | .13 | .02 |
| 11.7 | Conoco Alumina-5% CaO | .5 | 10.5 | 200 | .45 | .15 | .01 |
| 11.7 | Conoco Alumina-5% CaO | 1 | 11.5 | 220 | .45 | .40 | .01 |
| 11.7 | Conoco Alumina-5% CaO | 1 | 12.5 | 220 | .45 | .32 | .02 |
| 11.7 | Conoco Alumina-5% CaO | 1 | 13.5 | 220 | .45 | .27 | .01 |

The above comparisons clearly illustrate the superior diol removing properties and reduced ether formations of the calcium oxide on alumina catalyst over either calcium oxide alone or the other aluminas alone. Calcium oxide alone is clearly ineffective in removing diol from alcohol. The aluminas without calcium oxide while in a specific run were superior in ether diol removal or reduced ether formation but at no time were they superior in regard to both aspects.

Having thus described the invention, we claim:

1. An improved method for treating primary alcohols obtained by hydrolyzing an air-oxidized mixture of aluminum alkyls prepared by growing aluminum triethyl in the presence of ethylene to provide an alcohol product essentially free of dihydroxy compounds wherein the improvement comprises contacting said primary alcohols in the liquid phase with a calcium oxide on alumina catalyst at a temperature between about 170° and 275° C.

2. A method in accordance with claim 1 wherein the modified catalyst is contacted with the alcohols at a temperature between about 215° and 250° C.

3. A method in accordance with claim 2 wherein the contacted alcohols are thermally stripped to remove essentially all components having a boiling point lower than the lowest boiling mono-alcohol present therein.

4. A method in accordance with claim 3 wherein the contacted alcohols are hydrogenated followed by thermally stripping to remove substantially all components having a boiling point lower than the lowest boiling monoalcohol present therein.

5. A method in accordance with claim 3 wherein the stripped alcohols are hydrogenated.

* * * * *